United States Patent
King et al.

(10) Patent No.: US 6,563,638 B2
(45) Date of Patent: May 13, 2003

(54) WIDE-ANGLE COLLIMATING OPTICAL DEVICE

(75) Inventors: William B. King, Rancho Palos Verdes, CA (US); Chungte W. Chen, Irvine, CA (US); Ronald G. Hegg, Vista, CA (US); John E. Gunther, Morgan Hill, CA (US)

(73) Assignee: Raytheon Company, Lexington, MA (US)

( * ) Notice: Subject to any disclaimer, the term of this patent is extended or adjusted under 35 U.S.C. 154(b) by 12 days.

(21) Appl. No.: 09/843,668

(22) Filed: Apr. 26, 2001

(65) Prior Publication Data

US 2002/0159150 A1 Oct. 31, 2002

(51) Int. Cl.[7] .................................................. G02B 5/30
(52) U.S. Cl. ..................... 359/485; 349/11; 359/486; 359/487; 359/581; 359/583; 359/630; 359/631; 359/632
(58) Field of Search .................... 349/11; 359/485–487, 359/581, 583, 630–632, 641

(56) References Cited

U.S. PATENT DOCUMENTS

| | | |
|---|---|---|
| 3,443,858 A | 5/1969 | La Russa |
| RE27,356 E | 5/1972 | LaRussa |
| 3,940,203 A | 2/1976 | La Russa |
| 4,289,381 A | 9/1981 | Garvin et al. |
| 4,653,875 A | 3/1987 | Hines |
| 4,859,031 A | 8/1989 | Berman et al. |
| 5,383,053 A | 1/1995 | Hegg et al. |
| 5,715,023 A | 2/1998 | Hoppe |
| 6,075,651 A | 6/2000 | Hoppe |

FOREIGN PATENT DOCUMENTS

| | | |
|---|---|---|
| EP | 1 008 886 | 6/2000 |
| FR | 2 693 004 | 12/1993 |

OTHER PUBLICATIONS

Bernd Schnabel et al., Study on polarizing visible light by subwavelength–period metal–stripe gratings, *Opt.Eng.* vol. 38(2), pp. 220–226 (Feb. 1999).

Primary Examiner—Audrey Chang
Assistant Examiner—Craig H. Curtis
(74) Attorney, Agent, or Firm—Colin M. Raufer; Leonard A. Alkov; Glenn H. Lenzen, Jr.

(57) ABSTRACT

A collimating optical device utilizes a reflective beamsplitter in the form of a linear polarizing beamsplitter to achieve a wide field of view. One form of the wide-angle collimating optical device includes, in order from an image source, a first absorptive linear polarizer; a first quarter-wave plate; an optical doublet including a piano-concave singlet, a piano-convex singlet whose convex surface has the same curvature as the curvature of the concave surface, and a first reflective beamsplitter joining the concave surface of the plano-concave singlet to the convex surface of the plano-convex singlet; a second quarter-wave plate; and a second reflective beamsplitter. One of the reflective beamsplitters is a linear polarizing beamsplitter, most preferably a wire grid polarizer.

20 Claims, 2 Drawing Sheets

WIDE-ANGLE COLLIMATING OPTICAL DEVICE

This invention relates to a compact, wide-angle collimating optical device and, more particularly, to such a device utilizing a linear polarizing beamsplitter.

BACKGROUND OF THE INVENTION

A goal of modern military and police forces is to operate as effectively at night as in daylight. To accomplish this goal, night vision for troops is an important asset. Night-vision devices have been developed either to intensity available light in the visible band or to detect images using infrared energy. These devices are moderately effective when measured in terms of optical efficiency. Progress has also been made in reducing their size, weight, power consumption, and cost, and increasing their robustness and comfort for the user.

As the night-vision devices have been improved, their requirements have been expanded simply from the ability to visualize a scene at night to "situational awareness". One aspect of situational awareness is a wide field of view for the user of the device. Existing narrow-field-of-view night vision devices impart the sensation of looking down a narrow tunnel, so that the user does not have the advantages of the peripheral vision and other daylight capabilities that allow the user to be aware of events over a wide forward-looking field.

The available night-vision devices with moderate optical efficiency are limited to narrow fields of view of only a few degrees. The available night-vision devices with a wider field of view have poor optical efficiency. There is, accordingly, a need for an improved night-vision device with both a moderate-or-better optical efficiency, and a wide-angle field of view approaching 90 degrees. The present invention fulfills this need, and further provides related advantages.

SUMMARY OF THE INVENTION

The present invention provides a wide-angle optical collimating device which has moderate optical efficiency in one highly robust embodiment, and excellent optical efficiency in a less-robust embodiment that is acceptable for many applications. The maximum field of view of the device is on the order of about 90 degrees, giving the user much more awareness of the surroundings than possible with available narrow-view night-vision devices. The optical collimating device of the invention is light in weight and compact, making it useful for helmet-mounted or head-mounted display systems.

In accordance with the invention, a wide-angle collimating optical device comprises a first absorptive linear polarizer having a front face and a back face, a first quarter-wave plate having a front face in facing relation to the back face of the first absorptive linear polarizer, and a back face, and an optical doublet having a front face in facing relation to the back face of the first quarter-wave plate, and a back face. The optical doublet comprises a plano-concave singlet whose planar face forms the front face of the optical doublet and whose concave surface has a curvature thereto, a plano-convex singlet whose planar face forms the back face of the optical doublet and whose convex surface has the same curvature as the curvature of the concave surface, and a first reflective beamsplitter joining the concave surface of the plano-concave singlet to the convex surface of the plano-convex singlet. There is a second reflective beamsplitter having a front face and a back face. Exactly one of the first reflective beamsplitter and the second reflective beamsplitter is a linear polarizing beamsplitter, preferably a wire grid polarizer, and neither the first reflective beamsplitter nor the second reflective beamsplitter is a cholesteric liquid crystal. There is additionally a second quarter-wave plate having a front face and a back face. The front face of the second quarter-wave plate is in facing relation to the back face of the optical doublet and the back face of the second quarter-wave plate is in facing relation to the front face of the second reflective beamsplitter. The plano-concave singlet and the plano-convex singlet are each preferably made of glass. There may additionally be an infrared detector adjacent to the front face of the first absorptive linear polarizer.

In one form, the first reflective beamsplitter is the linear polarizing beamsplitter. In another form, the second reflective beamsplitter is the linear polarizing beamsplitter. In either case, there may be a second absorptive linear polarizer having a front face in facing relation to the back face of the second reflective beamsplitter. In a compact, rugged version, the back face of the first absorptive linear polarizer is bonded to the front face of the first quarter-wave plate, the back face of the first quarter-wave plate is bonded to the front face of the optical doublet, the back face of the optical doublet is bonded to the front face of the second quarter wave plate, and the back face of the second quarter wave plate is bonded to the front face of the second reflective beamsplitter.

Further in accordance with the invention, a wide-angle collimating optical device comprises an optical doublet having a front face and a back face. The optical doublet comprises a plano-concave singlet whose planar face forms the front face of the optical doublet and whose concave surface has a curvature thereto, a plano-convex singlet whose planar face forms the back face of the optical doublet and whose convex surface has the same curvature as the curvature of the concave surface, and a reflective beamsplitter joining the concave surface of the plano-concave singlet to the convex surface of the plano-convex singlet. The reflective beamsplitter comprises a linear polarizing beamsplitter. There are additionally a quarter-wave plate having a front face in facing relation to the back face of the optical doublet and a back face, and a cholesteric liquid crystal circular-polarizing beamsplitter having a front face in facing relation to the back face of the quarter-wave plate. The plano-concave singlet and the plano-convex singlet are each preferably made of glass. There may additionally be an infrared detector adjacent to the front face of the optical doublet.

Preferably for compactness and robustness, the back face of the optical doublet is bonded to the front face of the quarter-wave plate, and the back face of the quarter-wave plate is bonded to the front face of the cholesteric liquid crystal circular-polarizing beamsplitter.

There may additionally be an absorptive linear polarizer having a front face, and a back face in facing relation to the front face of the optical doublet. In this case, the back face of the absorptive linear polarizer is bonded to the front face of the optical doublet, the back face of the optical doublet is bonded to the front face of the quarter-wave plate, and the back face of the quarter-wave plate is bonded to the front face of the cholesteric liquid crystal circular-polarizing beamsplitter.

In the first approach, one of the reflective beamsplitters is preferably a linear polarizing beamsplitter and the other is a beamsplitter coating. No cholesteric liquid crystal is used, so that the device does not have the field-of-view, robustness, cost, color, and temperature limitations associated with the cholesteric liquid crystal. This device has an optical efficiency on the order of about 10 percent, and a wide field of view on the order of about 90 degrees.

In the second approach, a cholesteric liquid crystal is used in conjunction with a linear polarizing beamsplitter. The device is limited by the performance and cost of the cholesteric liquid crystal, and has a more limited field of view of about 60 degrees. However, it has an extremely high optical efficiency on the order of about 30 percent.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
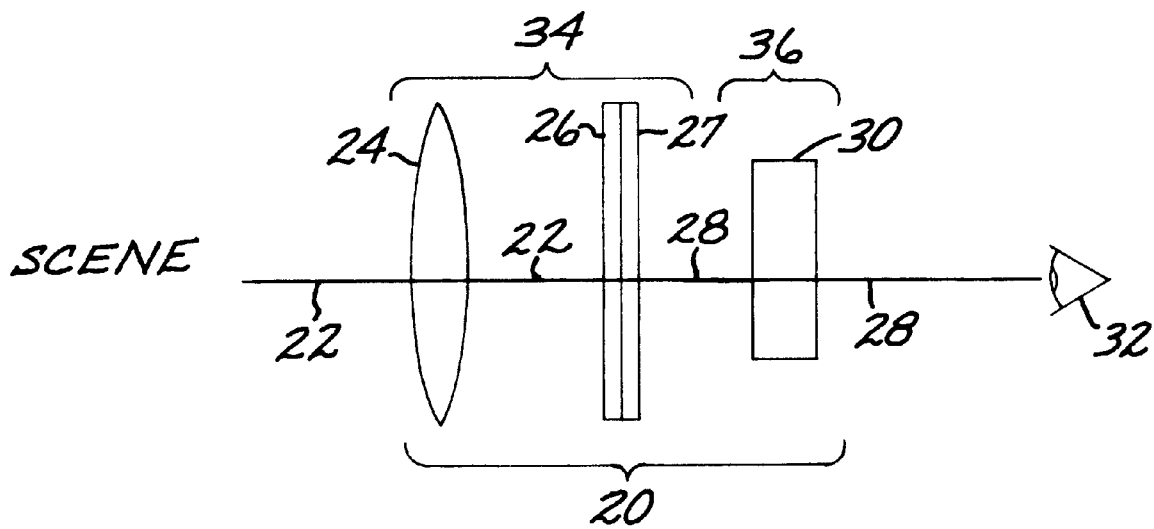
FIG. 1 is a schematic view of a night-vision device.

FIG. 1 depicts in general form a night-vision device 20 that operates using infrared energy emitted from a scene. The night-vision device 20 may be described as having a front end electro optic sensor unit 34 and a back end collimating optical device 36. The front end electro optic sensor unit 34 converts incident infrared energy 22 from a scene to visible light 28, which is thereafter collimated by the back end collimating optical device 36 for viewing by a human eye 32.

At the front end, the infrared energy 22 from the scene passes through an optical system, indicated schematically by a single lens 24. The optical system indicated schematically by the single lens 24 is preferably a wide field of view (WFOV) infrared optical system, but it may be of another type such as a narrow field of view (NFOV) infrared optical system. The following discussion will address the case of the preferred WFOV infrared optical system.

The infrared energy 22 thereafter is incident upon an infrared detector 26 such as an infrared focal plane array (IRFPA). The output of the infrared detector 26 is displayed on a visible image source 27 such as a liquid crystal display (LCD) or an active matrix organic light-emitting diode (AMOLED). This front end electro optic sensor unit 34 (including elements 24, 26, and 27) thus converts the infrared energy 22 to a visible light beam 28. The visible light beam 28 is collimated by a wide-angle collimating optical device 30 and enters the eye 32 of a human observer. The illustrated device operates at unit magnification with the WFOV optics on the front end, but it is not so limited and may optionally employ optics to change the magnification. Operable infrared detectors 26 and image sources 27 are known in the art. Although these elements are known in the art for other applications and the present invention deals primarily with the wide-angle collimating optical device 30 and its structure, the combination of these elements and the wide-angle collimating optical device 30 is not known.

Figure 2:
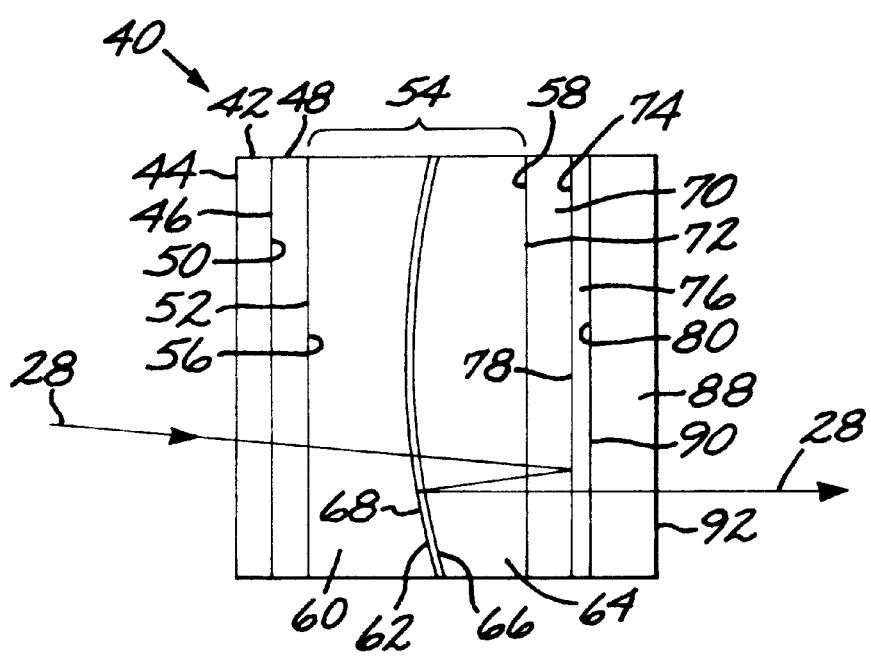
FIG. 2 is a schematic drawing of a first embodiment of the wide-angle collimating optical device.

One form of the wide-angle collimating optical device 30 is shown in FIG. 2 as a wide-angle collimating optical device 40 with an exemplary ray path of the visible light beam 28. The wide-angle collimating optical device 40 includes a first absorptive linear polarizer 42 having a front face 44 and a back face 46. A first quarter-wave plate 48 has a front face 50 in facing relation to the back face 46 of the first absorptive linear polarizer 42, and a back face 52.

An optical doublet 54 has a front face 56 in facing relation to the back face 52 of the first quarter-wave plate 48, and a back face 58. The optical doublet 54 comprises a plano-concave singlet 60 whose planar face forms the front face 56 of the optical doublet 54 and whose concave surface 62 has a curvature thereto. The curvature of the concave surface 62 establishes the focal length of the optical collimating device, and is designed according to principles known in the art. The optical doublet 54 further comprises a plano-convex singlet 64 whose planar face forms the back face 58 of the optical doublet 54 and whose convex surface 66 has the same curvature as the curvature of the concave surface 62 of the plano-concave singlet 60. The singlets 60 and 64 are preferably made of glass for visible-light transparency. A first reflective beamsplitter 68 joins the concave surface 62 of the plano-concave singlet 60 to the convex surface 66 of the plano-convex singlet 64. In this embodiment, the first reflective beamsplitter 68 is preferably a coating, most preferably a 50:50 neutral density beamsplitter coating such as a metallic thin film or a multilayer dielectric film.

A second quarter-wave plate 70 has a front face 72 in facing relation to the back face 58 of the optical doublet 54, and a back face 74.

Figure 3:
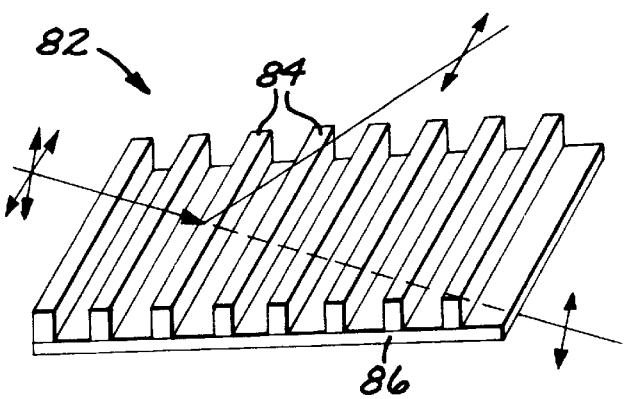
FIG. 3 is a perspective view of a wire grid polarizer.

A second reflective beamsplitter 76 has a front face 78 in facing relation to the back face 74 of the second quarter-wave plate 70 and a back face 80. In this embodiment, the second reflective beamsplitter 76 is a linear polarizing beamsplitter. A preferred form of the linear polarizing beamsplitter is a wire grid polarizer 82 shown in greater detail in FIG. 3. The wire grid polarizer 82 is formed of an array of parallel metallic stripes 84 supported on a glass, plastic, or other transparent, electrically nonconducting substrate 86. Wire grid polarizers 82 are known in the art for other applications and are described, for example, in U.S. Pat. No. 4,289,381, whose disclosure is incorporated by reference, and Bernd Schnabel et al., "Study on polarizing visible light by subwavelength-period metal-stripe gratings, Opt.Eng. Vol. 36(2), pages 220–226 (February 1999). The presently preferred approach results in a wide field of view because the wire-grid polarizer has a wide angle of response.

The linear polarizing beamsplitter such as the wire grid polarizer 82 is to be distinguished from a circular polarizing beamsplitter such as a cholesteric liquid crystal. The linear polarizing beamsplitter produces linearly polarized reflected and transmitted beams, while the circular polarizing beamsplitter produces circularly polarized reflected and transmitted beam. Only the linear polarizing beamsplitter will function in the present approach where indicated, and the circular polarizing beamsplitter may not be substituted therefor. The embodiment of FIG. 5 of the present invention uses a circularly polarizing beamsplitter in a different manner in the collimating optical device 40.

Optionally, a second absorptive linear polarizer 88 has a front face 90 in facing relation to the back face 80 of the second reflective beamsplitter 76, and a back face 92.

The elements of the wide-angle collimating optical device 40 are preferably, but not necessarily, bonded together. In the preferred structure, the back face 46 of the first absorptive linear polarizer 42 is bonded to the front face 50 of the first quarter-wave plate 48, the back face 52 of the first quarter-wave plate 48 is bonded to the front face 56 of the optical doublet 54, the back face 58 of the optical doublet 54 is bonded to the front face 72 of the second quarter-wave plate 70, the back face 74 of the second quarter-wave plate 70 is bonded to the front face 78 of the second reflective beamsplitter 76, and the back face 80 of the second reflective beamsplitter 76 is bonded to the front face 90 of the second absorptive linear polarizer 88 (in those cases where the optional second absorptive linear polarizer 88 is present). The bonding is performed with conventional optical cement.

Tracing the ray path of the visible light beam 28, the beam 28 enters the device unpolarized and is polarized to one orientation, p for example, by the first absorptive linear polarizer 42. After passing through the first quarter-wave plate 48, the light is right-hand circularly polarized. After passing through the second quarter-wave plate 70, the resulting s-polarized light reflects from the second reflective beamsplitter 76, reflects again from the first reflective beamsplitter 68, and passes through the second quarter-wave plate 70 for the third time to emerge as p-polarized light. Any stray s-polarized light may be removed by the optional second absorptive linear polarizer 88, so that pure p-polarized light reaches the eye 32. Such s-polarized stray light, if not removed from the light that reaches the eye 32, may not be collimated and may appear as a glare that obscures the desired image.

Figure 4:
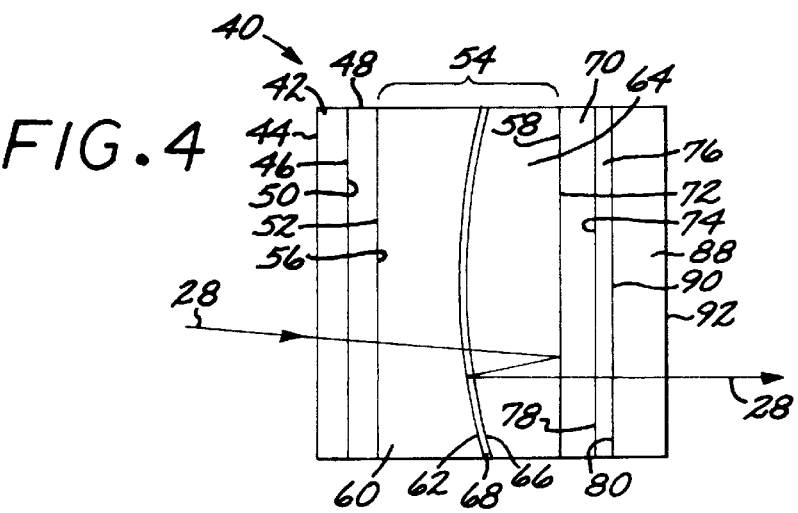
FIG. 4 is a schematic drawing of a second embodiment of the wide-angle collimating optical device.

FIG. 4 depicts a second embodiment of the wide-angle collimating optical device 40. The embodiment of FIG. 4 is like that of FIG. 2 except as will be discussed next, and the above description of the embodiment of FIG. 2 is incorporated to the extent applicable. The embodiment of FIG. 4 differs in that the first reflective beamsplitter 68 is the linear polarizing beamsplitter, preferably the wire grid polarizer 82. The second reflective beamsplitter 76 is a coating, preferably the 50:50 neutral density beamsplitter coating such that described earlier. As discussed earlier, the various faces are preferably joined together, most preferably with an optical cement.

Figure 5:
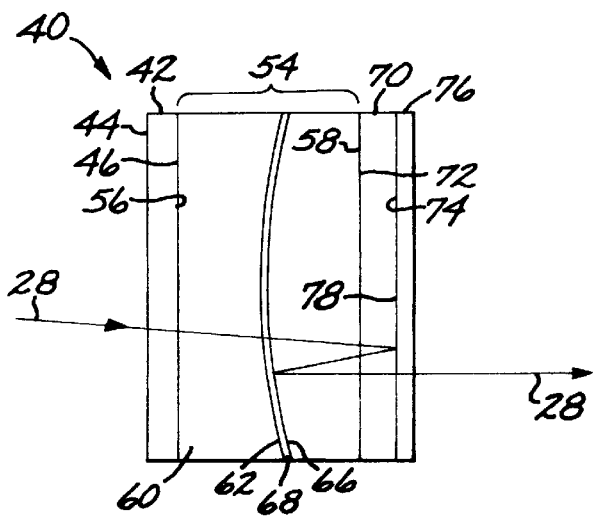
FIG. 5 is a schematic drawing of a third embodiment of the wide-angle collimating optical device.

FIG. 5 depicts a third embodiment of the wide-angle collimating optical device 40. The embodiment of FIG. 5 has similarities with those of FIGS. 2 and 4, except as will be discussed next, and the above description of the embodiments of FIGS. 2 and 4 is incorporated to the extent applicable. In the embodiment of FIG. 5, the first absorptive linear polarizer 42 is optional, and the first quarter-wave plate 48 is omitted. Where the first absorptive linear polarizer 42 is present (as illustrated), its back face 46 is in facing relation with the front face 56 of the optical doublet 54. The first reflective beamsplitter 68 is a linear polarizing beamsplitter. The front face 72 of the second quarter-wave plate 70 is in facing relation with the back face 58 of the optical doublet 54. (There is only one quarter-wave plate 70 in this embodiment, but it is termed the "second" quarter-wave plate to maintain consistency and to avoid confusion with the descriptions of the other embodiments.) The front face 78 of the second reflective beamsplitter 76 is in facing relation with the back face 74 of the second quarter wave plate 70. As discussed earlier, the various faces are preferably joined together, most preferably with an optical cement.

In the FIG. 5 embodiment, the second reflective beamsplitter 76 is a cholesteric liquid crystal circular polarizing beamsplitter. Such cholesteric liquid crystal circular polarizing beamsplitters are known in the art. While the embodiments of FIGS. 2 and 4 avoid the use of the cholesteric liquid crystal circular polarizing beamsplitter because it tends to reduce the field of view significantly due to its performance features, this embodiment accepts a reduction in the field of view from about 90 degrees to about 60 degrees. On the other hand, the cholesteric liquid crystal circular polarizing beamsplitter 76, in combination with the wire grid first reflective beamsplitter 68, results in an extremely high optical efficiency of about 30 percent. Thus, the embodiments of FIGS. 2 and 4 have wide fields of view and moderate optical efficiencies, and the embodiment of FIG. 5 has a moderate field of view and a high optical efficiency.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A wide-angle collimating optical device, comprising:
   a first absorptive linear polarizer having a front face and a back face;
   a first quarter-wave plate having a front face in facing relation to the back face of the first absorptive linear polarizer, and a back face;
   an optical doublet having a front face in facing relation to the back face of the first quarter-wave plate, and a back face, the optical doublet comprising
      a plano-concave singlet having a planar face which forms the front face of the optical doublet and a concave surface having a curvature thereto,
      a plano-convex singlet having a planar face which forms the back face of the optical doublet and a convex surface with the same curvature as the curvature of the concave surface, and
      a first reflective beamsplitter joining the concave surface of the plano-concave singlet to the convex surface of the plano-convex singlet;
   a second reflective beamsplitter having a front face and a back face, wherein
      exactly one of the first reflective beamsplitter and the second reflective beamsplitter is a linear polarizing beamsplitter, and
      neither the first reflective beamsplitter nor the second reflective beamsplitter is a cholesteric liquid crystal; and
   a second quarter-wave plate having a front face and a back face, wherein the front face of the second quarter-wave plate is in facing relation to the back face of the optical doublet and the back face of the second quarter-wave plate is in facing relation to the front face of the second reflective beamsplitter.

2. The wide-angle collimating optical device of claim 1, wherein the linear polarizing beamsplitter is a wire grid polarizer.

3. The wide-angle collimating optical device of claim 1, further including
   a second absorptive linear polarizer having a front face in facing relation to the back face of the second reflective beamsplitter.

4. The wide-angle collimating optical device of claim 1, wherein
   the back face of the first absorptive linear polarizer is bonded to the front face of the first quarter-wave plate,
   the back face of the first quarter-wave plate is bonded to the front face of the optical doublet,
   the back face of the optical doublet is bonded to the front face of the second quarter-wave plate, and the back face of the second quarter-wave plate is bonded to the front face of the second reflective beamsplitter.

5. The wide-angle collimating optical device of claim 1, wherein the first reflective beamsplitter is the linear polarizing beamsplitter.

6. The wide-angle collimating optical device of claim 1, wherein the second reflective beamsplitter is the linear polarizing beamsplitter.

7. The wide-angle collimating optical device of claim 1, wherein the plano-concave singlet and the plano-convex singlet are each made of glass.

8. The wide-angle collimating optical device of claim 1, further including
an infrared detector adjacent to the front face of the first absorptive linear polarizer.

9. A wide-angle collimating optical device, comprising:
a first absorptive linear polarizer having a front face and a back face;
a first quarter-wave plate having a front face in facing relation to the back face of the first absorptive linear polarizer, and a back face;
an optical doublet having a front face in facing relation to the back face of the first quarter-wave plate, and a back face, the optical doublet comprising
a plano-concave singlet having a planar face which forms the front face of the optical doublet and a concave surface having a curvature thereto,
a plano-convex singlet having a planar face which forms the back face of the optical doublet and a convex surface having the same curvature as the curvature of the concave surface, and
a first reflective beamsplitter joining the concave surface of the plano-concave singlet to the convex surface of the plano-convex singlet;
a second quarter-wave plate having a front face in facing relation to the back face of the optical doublet and a back face; and
a second reflective beamsplitter having a front face in facing relation to the back face of the second quarter-wave plate, and a back face, wherein the second reflective beamsplitter is a linear polarizing beamsplitter.

10. The wide-angle collimating optical device of claim 9, wherein the linear polarizing beamsplitter is a wire grid polarizer.

11. The wide-angle collimating optical device of claim 9, wherein
the back face of the first absorptive linear polarizer is bonded to the front face of the first quarter-wave plate,
the back face of the first quarter-wave plate is bonded to the front face of the optical doublet,
the back face of the optical doublet is bonded to the front face of the second quarter-wave plate, and
the back face of the second quarter-wave plate is bonded to the front face of the second reflective beamsplitter.

12. The wide-angle collimating optical device of claim 9, further including
a second absorptive linear polarizer having a front face in facing relation to the back face of the second reflective beamsplitter, and a back face.

13. The wide-angle collimating optical device of claim 12, wherein the back face of the first absorptive linear polarizer is bonded to the front face of the first quarter-wave plate,
the back face of the first quarter-wave plate is bonded to the front face of the optical doublet,
the back face of the optical doublet is bonded to the front face of the second quarter-wave plate,
the back face of the second quarter-wave plate is bonded to the front face of the second reflective beamsplitter, and
the back face of the second reflective beamsplitter is bonded to the front face of the second absorptive linear polarizer.

14. The wide-angle collimating optical device of claim 9, further including
an infrared detector adjacent to the front face of the first absorptive linear polarizer.

15. A wide-angle collimating optical device, comprising:
an optical doublet having a front face and a back face, the optical doublet comprising
a plano-concave singlet having a planar face which forms the front face of the optical doublet and a concave surface having a curvature thereto,
a plano-convex singlet having a planar face which forms the back face of the optical doublet and a convex surface having the same curvature as the curvature of the concave surface, and
a reflective beamsplitter joining the concave surface of the plano-concave singlet to the convex surface of the plano-convex singlet, the reflective beamsplitter comprising a linear polarizing beamsplitter;
a quarter-wave plate having a front face in facing relation to the back face of the optical doublet and a back face; and
a cholesteric liquid crystal circular-polarizing beamsplitter having a front face in facing relation to the back face of the quarter-wave plate.

16. The wide-angle collimating optical device of claim 15, wherein the linear polarizing beamsplitter is a wire grid polarizer.

17. The wide-angle collimating optical device of claim 15, wherein
the back face of the optical doublet is bonded to the front face of the quarter-wave plate, and
the back face of the quarter-wave plate is bonded to the front face of the cholesteric liquid crystal circular-polarizing beamsplitter.

18. The wide-angle collimating optical device of claim 15, further including
an absorptive linear polarizer having
a front face, and
a back face in facing relation to the front face of the optical doublet.

19. The wide-angle collimating optical device of claim 15, wherein the plano-concave singlet and the piano-convex singlet are each made of glass.

20. The wide-angle collimating optical device of claim 15, further including
an infrared detector adjacent to the front face of the optical doublet.

* * * * *